(12) United States Patent
Itami

(10) Patent No.: US 7,780,806 B2
(45) Date of Patent: Aug. 24, 2010

(54) TIRE FOR AN AIRCRAFT AND METHOD FOR PRODUCING THE SAME

(75) Inventor: Daisuke Itami, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 176 days.

(21) Appl. No.: 11/783,680

(22) Filed: Apr. 11, 2007

(65) Prior Publication Data

US 2007/0246141 A1    Oct. 25, 2007

(30) Foreign Application Priority Data

Apr. 13, 2006   (JP)   ............................. 2006-110856

(51) Int. Cl.
  B29D 30/06   (2006.01)
  B29D 30/16   (2006.01)
  B29D 30/30   (2006.01)
  B60C 9/18    (2006.01)
  B60C 9/22    (2006.01)

(52) U.S. Cl. .................... 156/110.1; 156/117; 156/123; 156/124; 152/526; 152/531; 152/538

(58) Field of Classification Search ............. 156/110.1, 156/117, 123, 124; 152/526, 531, 533, 535, 152/538

See application file for complete search history.

(56) References Cited

U.S. PATENT DOCUMENTS 3,770,042 A    11/1973   Greene et al.
4,702,293 A *  10/1987   Iwata et al. ................. 152/531
4,889,173 A *  12/1989   Mathews ..................... 152/528
5,053,098 A *  10/1991   Perkins et al. .............. 156/177

(Continued)

FOREIGN PATENT DOCUMENTS

DE    42 14 197 A1    11/1993

(Continued)

OTHER PUBLICATIONS

Machine translation of JP 9-104207, 1997.*

(Continued)

*Primary Examiner*—Justin Fischer
(74) *Attorney, Agent, or Firm*—Sughrue Mion, PLLC

(57) ABSTRACT

There is provided a tire for an aircraft capable of enhancing abrasion resistance and effectively preventing a progress of peeling of the non-extensible cords of the main belt layers even when the tire suffers external injury reaching the main belt layers. A tire comprises a pair of bead cores 4, a carcass 5 toroidaly extending between the bead cores, a main belt 6 disposed on an outer peripheral side of a crown area of the carcass 5 and consisting of main belt layers having a spirally-wound structure of a non-extensible cord, and a sub belt 7 disposed on the outer peripheral side of the main belt 6 and consisting of sub belt layers 7a, 7b having an organic fiber cord extending in a circumferential direction of the tire in a zigzag pattern, wherein the sub belt layers 7a, 7b are formed in such a manner that the organic fiber cord in a zigzag pattern is wound several times in the circumferential direction of the tire, and that a crossing angle of the organic fiber cord with respect to an equatorial plane of the tire is within a range between 45 degrees and 90 degrees.

5 Claims, 4 Drawing Sheets

U.S. PATENT DOCUMENTS 5,535,801 A * 7/1996 Iseki et al. .................. 152/528
6,116,311 A * 9/2000 Ueyoko et al. .............. 152/531

FOREIGN PATENT DOCUMENTS

| EP | 1 518 666 A2 | 3/2005 |
|---|---|---|
| JP | 9-104207 * | 4/1997 |
| JP | 11/222010 A | 8/1999 |
| WO | WO 03/061991 A1 | 7/2003 |

OTHER PUBLICATIONS

European Search Report dated Jul. 30, 2007.

* cited by examiner (a)

(b)

TIRE FOR AN AIRCRAFT AND METHOD FOR PRODUCING THE SAME

BACKGROUND OF THE INVENTION

1. Field of the Invention

The present invention relates to a tire, especially a pneumatic radial tire for an aircraft and a method for producing same. More particularly, the present invention provides a technique of enhancing abrasion resistance and significantly improving durability after the tire suffers external injury.

2. Description of Related Art

A conventional radial tire for an aircraft is disclosed in, for example, International Publication WO 2003/061991. In this tire, a main belt disposed on an outer peripheral side of a crown area of a carcass consists of, for example, eight main belt layers. Each main belt layer is formed, as a so-called spiral belt, in such a manner that a plurality of organic fiber cords are rubber-coated to form a strip-shaped elongated body which is subsequently spirally wound so that no gap is generated and an angle of the organic fiber cords with respect to an equatorial plane of the tire is generally 0 degree. A sub belt of which width may be set to 103% of the width of the main belt is formed by arranging, for example, one sub belt layer on the outer peripheral side of the main belt. The sub belt layer is formed in such a manner that one or more organic fiber cords are rubber-coated to form a strip-shaped elongated body, and the elongated body is wound such that whenever the elongated body is wound once, the elongated body reciprocate between both ends of the sub belt layer and the elongated body is inclined at an angle of 2 to 25 degrees with respect to the equatorial plane of the tire, and this winding is carried out several times offsetting the elongated body as substantially the same distance as their width in the circumferential direction such that no gap is generated between the elongated body. In this way the amount of extension of the tread rubber in the circumferential direction in the central area of the tread portion in the state that the tire is pressurized and rotated in high speed can be suppressed and therefore, the resistance of the tread portion against penetration and the like of a foreign object under a low tensile condition of the rubber can be increased. In addition, even if a foreign object penetrates the tread portion, the growth of the crack can be suppressed.

SUMMARY OF THE INVENTION

However, in this conventional tire, the organic fiber cord of the spiral belt extends at an angle of 0 degree with respect to the equatorial plane of the tire and the organic fiber cord of the sub belt layer extends at an angle of 2 to 25 degrees with respect to the equatorial plane of the tire. Since the both cords extend at smaller angles with respect to the equatorial plane of the tire, both of the main and sub belts naturally have smaller stiffness in the width direction of the tread of the tire and movement of the tread portion toward the width direction of the tread portion increases when the tire is pressurized and rotated in high speed. Therefore, it is likely that an abrasion rate may be increased in the shoulder portion where input force in the width direction is especially large and that a shape of the abraded tread portion is uneven in the width direction of the tread portion, which results in bad appearances of the tire. Moreover, in addition to a requirement for further improvement of resistance to external injury, improvement of durability for retreading is being more demanded from the viewpoint of effective utilization of resources.

The present invention aims to further improve various performances of the conventional tire and its object is to provide a tire for an aircraft and a method for producing same which can enhance abrasion resistance, effectively prevent a progress of peeling of the non-extensible cords of the main belt layers even when the tire suffers external injury reaching the main belt layers, and effectively suppress separation of the sub belt layers from the main belt layer in the lateral areas thereof.

A tire for an aircraft according to the present invention comprises a pair of bead cores, a carcass having, for example, a radial structure consisting of one or more carcass plies toroidaly extending between the bead cores, a main belt disposed on an outer peripheral side of a crown area of the carcass and consisting of one or more main belt layers, the main belt layers having a spirally-wound structure around a central axis of the tire formed by one or more non-extensible cords such as an aromatic polyamide cord, a steel cord, a hybrid cord containing an aromatic polyamide cord and aliphatic polyamide and the like and a sub belt disposed on the outer peripheral side of the main belt and consisting of one or more sub belt layers formed by one or more organic fiber cords such as a nylon fiber cord, a rayon fiber cord, a polyester fiber cord and the like extending in a circumferential direction of the tire in a zigzag pattern, wherein the sub belt layer is formed in such a manner that the organic fiber cord in a zigzag pattern is wound several times in the circumferential direction of the tire, and that a crossing angle of the organic fiber cord with respect to an equatorial plane of the tire, i.e. a crossing angle of the cord at the central position of the sub belt layer in the width direction is within a range between 45 degrees and 90 degrees, and more preferably between 80 degrees and 90 degrees.

In the tire according to the present invention, a width of the main belt is preferably within a range between 100% and 110% of a tread contact width, and a width of the sub belt is preferably within a range between 80 and 100% of the tread contact width and less than 90% of the width of the main belt. The term "tread contact width" as used herein means a maximum linear length of a contact surface of the tire on a flat plate in the axial direction of the tire measured in the state that the tire is disposed perpendicularly and fixedly on the flat plate and applied a load corresponding to a given mass with the tire being mounted on an applicable rim and filled with air at a given pressure.

In this connection, the term "applicable rim" means a rim regulated by the standards mentioned below depending on the tire size. The term "given pressure" means an air pressure regulated by the standards mentioned below depending on the maximum load capacity, which means the maximum mass allowed to load the tire. The term "given mass" means the above-mentioned maximum load capacity. The air as used herein may be substituted for by an inactive gas, such as a nitrogen gas, or the like.

The above-mentioned standards, which are regulated by industrial standards effective in the areas where the tire is manufactured or used, refer to "YEAR BOOK of THE TIRE and RIM ASSOCIATION INC." in the United States and "STANDARDS MANUAL of The European Tyre and Rim Technical Organization" in Europe.

It is preferable that the sub belt layer is formed in such a manner that a plurality of organic fiber cords arranged in parallel to each other are wound twice in the circumferential direction of the tire, and that the crossing angle of the organic fiber cord with respect to the equatorial plane of the tire is 90 degrees.

A method for producing a tire for an aircraft according to the present invention produces a tire of a kind mentioned in the above comprising a pair of bead cores, a carcass consisting of one or more carcass plies toroidaly extending between the bead cores, a main belt disposed on an outer peripheral side of a crown area of the carcass and consisting of one or more main belt layers having a spirally-wound structure of a non-extensible cord, and a sub belt disposed on the outer peripheral side of the main belt and consisting of one or more sub belt layers having an organic fiber cord extending in the circumferential direction of the tire in a zigzag pattern, and the method comprises the steps of: forming a main belt layer member by spirally winding, around a line corresponding to a central axis of a product tire, a strip in which one non-extensible cord or plural non-extensible paralleled cords are coated with unvulcanized rubber, and forming a sub belt layer member on the outer peripheral side of the main belt layer by stretching, in a zigzag pattern between positions corresponding to both lateral ends of the sub belt layer of a product tire, a ribbon-like strip in which one non-extensible organic cord or plural non-extensible paralleled organic cords are also coated with unvulcanized rubber a crossing angle of the organic fiber cord with respect to a circumferential line segment of the tire, i.e. a crossing angle of the cord with respect to an equatorial plane of a tire under building being within a range between 45 degrees and 90 degrees, and more preferably between 80 degrees and 90 degrees, and winding the zigzag shaped strip in the circumferential direction several times.

In this connection, the reason that the crossing angle of the organic fiber cord with respect to the equatorial plane of the green tire is set within a range between 45 degrees and 90 degrees is that when each belt layer member is formed in a shaping state with respect to the carcass band or the like even by a conventional forming method on a typical forming drum, the change of the crossing angle of the cord of the green tire during vulcanization is so small that can be neglected and therefore the crossing angle is generally equal to that of a production tire.

In the above-mentioned method, the sub belt layer member is more preferably formed by extending the ribbon-like strip twice in the circumferential direction of the tire with the above-mentioned crossing angle of the organic fiber cord with respect to the circumferential line segment of the tire being 90 degrees.

In a tire for an aircraft according to the present invention, the organic fiber cord constituting the sub belt layer extends at an angle of 45 to 90 degrees, and more preferably 80 to 90 degrees with respect to the equatorial plane of the tire which angle is considerably larger than that of a conventional tire, so that the main belt in which the cord extends at a smaller angle with respect to the equatorial plane of the tire can be effectively compensated for its lower stiffness in the width direction of the tread portion by the sub belt layer. As a result, movement of the tread portion and the main belt toward the width direction of the tread can be effectively suppressed. This can significantly enhance abrasion resistance with suppressing movement of the tread portion.

Furthermore, by arranging the organic fiber cord of the sub belt layer eat the above-mentioned larger extending angle, i.e. within a range of 45 to 90 degrees, even when the tire suffers external injury reaching the main belt, constraint force by the sub belt layers can effectively prevent peeling of the non-extensible cords of the main belt layers from progressing in the circumferential direction of the tire. In this case, when the crossing angle of the cord is less than 45 degrees, resistance to tension of the organic fiber cord in the circumferential direction is larger than that in the width direction, so that it is difficult to achieve the desired effect.

In this tire, when the width of the main belt is within a range between 100% and 110% of the tread contact width, generation of standing wave while the tire is rotated in high speed with a heavy load and separation of the main belt layers in the lateral end portions thereof can be effectively suppressed.

That is, when the width of the main belt is less than 100% of the tread contact width, generation of standing wave cannot be sufficiently suppressed. On the other hand, when the width is more than 110%, strain between the main belts in the lateral sides thereof is increased, which is likely to cause generation of separation of the main belt layers in the lateral end portions thereof.

Turning now to the sub belt layer, the width of the sub belt is within a range between 80 and 100% of the tread contact width and less than 90% of the width of the main belt to optimize the correlation between the width of the main belt layer and the width of sub belt layer. Therefore, in addition to sufficiently realize the above-mentioned required function, shear strain between those layers is reduced to be able to prevent generation of separation. As a result, durability for retreading of a tire can be significantly improved.

In other words, when the width of the sub belt is less than 80% of the tread contact width, the suppression function of movement of the tread portion to the tread shoulder portion toward the width direction of the tread is likely to be insufficient. On the other hand, when the width is more than 100%, separation due to strain is likely to be generated in the lateral end portions of this sub belt in which suppression function against standing wave is hardly realized. In addition, when the width of the sub belt is not less than 90% of the width of the main belt, shear strain between the main belt and sub belt is increased so that separation between them is more likely to be generated.

When the sub belt layer is formed in such a manner that a plurality of organic fiber cords arranged in parallel to each other are wound twice in the circumferential direction of the tire, the sub belt layer can be easily formed with high working efficiency and the thickness of the area where the organic fiber cords extending in a zigzag pattern are overlapped is minimized so that fluctuation of thickness of each sub belt layer in the width direction of the belt can be as small as possible.

In this case, when the crossing angle of the organic fiber cord with respect to the equatorial plane of the tire is 90 degrees, the sub belt layer and, in turn, the sub belt can more effectively function in order to enhance abrasion resistance to the tread contact surface and to prevent peeling of the cords of the main belt layers due to external injury from progressing in the circumferential direction.

In a method for producing a tire for an aircraft according to the present invention, rubber-coated strip is spirally wound without creating a gap to form the main belt layer member, so that cut ends of the non-extensible cords in the main belt layer are exposed as small as possible so as to be able to effectively eliminate the risk of separation of the main belt layer in the lateral end portions thereof due to picking of the cut ends of the cords and to form the required number of the main belt layer members easily, rapidly and effectively.

Also in this case, the ribbon-like strip in which the organic fiber cords are rubber-coated extends in a zigzag pattern to form the sub belt layer member, so that exposure of the cut ends of the cords in the sub belt layer can be effectively prevented.

In this case, since the sub belt layer member is formed in such a manner that the ribbon-like strip of the organic fiber cord extending in a zigzag pattern is wound several times in the circumferential direction of the tire, the amount of bending in each bent strip in a zigzag pattern can be remarkably reduced as compared with the case where the sub belt layer member is formed in such a manner that the ribbon-like strip is wound once in the circumferential direction of the tire. Therefore, residual stress in the ribbon-like strip and, in turn, the organic fiber cords in the strip or the amount of strain of the organic fiber cords is sufficiently suppressed to improve durability of the sub belt layer itself to a large extent.

In addition, since the crossing angle of the organic fiber cord with respect to the equatorial plane of the tire is within a range between 45 degrees and 90 degrees, and more preferably between 80 degrees and 90 degrees, peeling of the non-extensible cords of the main belt layers can be effectively prevented from progressing in the circumferential direction, as described above.

It is noted that in this method, when the sub belt layer member is formed by extending the ribbon-like strip twice in the circumferential direction of the tire, the sub belt layer member can be easily formed without causing large stress, strain and the like in the organic fiber cords as well as uneven overlap of ribbon-like strip at the bent portion can be effectively prevented.

In this case, when the crossing angle of the organic fiber cord with respect to the circumferential component of the tire is 90 degrees, as mentioned above, the sub belt layer and, in turn, the sub belt can more effectively function in order to enhance abrasion resistance to the tread contact surface and to prevent peeling of the cords of the main belt layers due to external injury from progressing in the circumferential direction.

DESCRIPTION OF THE PREFERRED EMBODIMENTS

Figure 1:
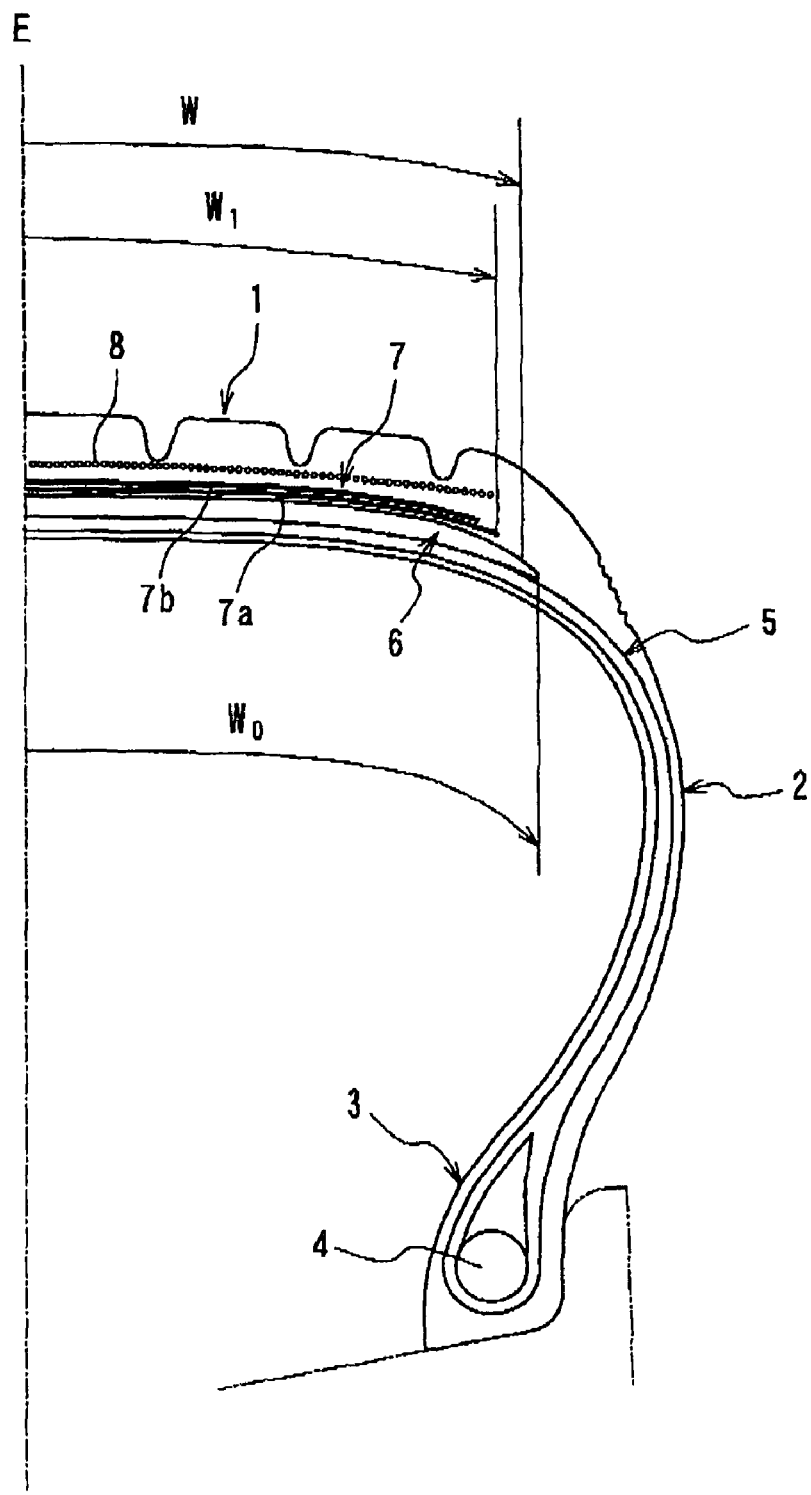
FIG. 1 is a widthwise sectional view of a right half of a tire according to one embodiment of the present invention.

FIG. 1 a widthwise sectional view of a right half of a tire for an aircraft according to an embodiment of the present invention, in a state where the tire is mounted on an applicable rim and filled with air at a given air pressure. A tire shown in FIG. 1 has a tread portion 1, a pair of side wall portions 2 extending radially inwardly from each lateral side of the tread portion 1, and bead portions 3 continuing from the inner peripheral sides of each side wall portion 2.

A carcass 5 consists of one or more carcass plies toroidally extending between the bead cores 4, which are embedded in each of the bead portions 3, and turning around the bead cores 4 at its lateral sides. The carcass 5 is disposed, for example, in a radial arrangement so as to reinforce the above-mentioned tread portion 1, side wall portions 2 and the bead portions 3. A main belt 6 consisting of one or more main belt layers, for example, four to six main belt layers having a spirally-wound structure of non-extensible cords such as aromatic polyamide cords is disposed on the outer peripheral side of the crown area of the carcass 5. A sub belt 7 consisting of at least one sub belt layer, in this figure, two sub belt layers 7a, 7b, having organic fiber cords such as nylon cords extending in the circumferential direction of the tire in a zigzag pattern is disposed on the outer peripheral side of this main belt layer 6.

A belt protection layer 8 is disposed on the outer peripheral side of the sub belt 7 and covers the sub belt 7 across its generally entire width. This belt protection layer 8 may consist of an wave-shaped ply configured in such a way that a plurality of organic fiber cords extending in the circumferential direction of the tire in a wave pattern are arranged in parallel to each other.

Figure 2:
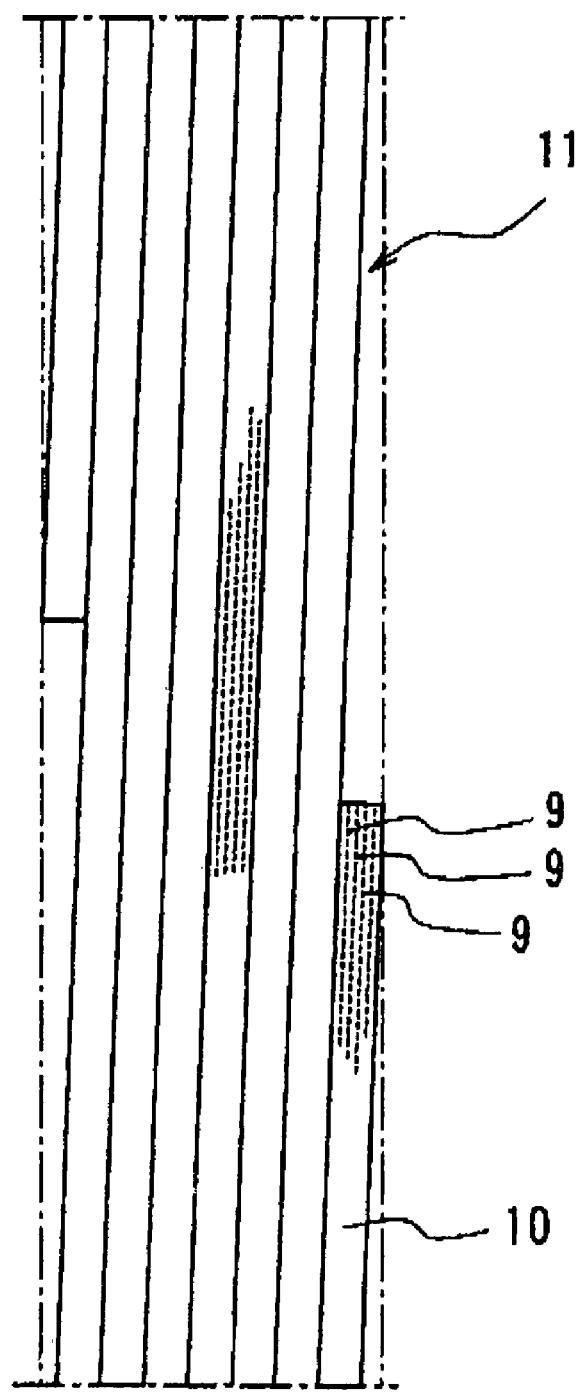
FIG. 2 is a partial development view illustrating a main belt layer and in particular an arrangement of a main belt layer member.

Each main belt layer having a spirally-wound structure of the non-extensible cords and constituting the main belt 6 can be formed in the following manner, for example, as shown in FIG. 2 as a partial development view; a plurality of non-extensible paralleled cords 9 are integrally coated with unvulcanized rubber to form a strip 10; the strip is spirally wound around a line corresponding to the central axis of a product tire from a given lateral side to the other lateral side of the main belt layer with no gap; the spiral winding is continued until it covers the entire area corresponding the required width of each main belt layer to form the main belt layer member 11; the same number of the main belt layer members 11 as that of the given main belt layers are prepared; and thus-formed main belt layer members 11 are integrally vulcanized.

Figure 3:
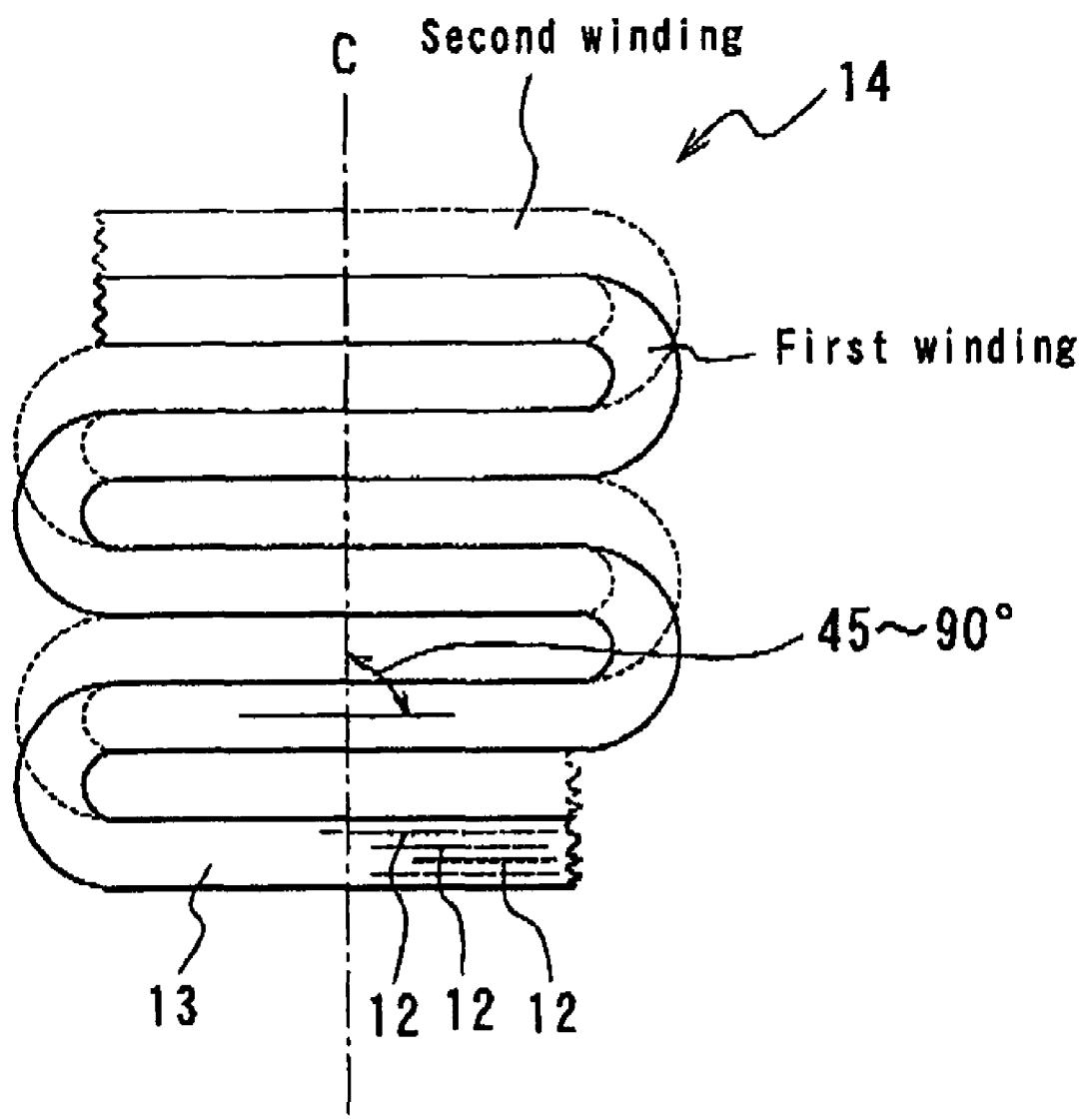
FIG. 3 is a partial development view illustrating a sub belt layer and in particular an arrangement of a sub belt layer member.

Each sub belt layer 7a, 7b having the organic fiber cords extending in the circumferential direction of the tire in a zigzag pattern can be formed in the following manner, for example, as shown in FIG. 3 in a partial development plan view; a plurality of organic fiber cords 12, which may be nylon cords, are arranged in parallel to each other and integrally coated with unvulcanized rubber to form a ribbon-like strip 13; the strip is stretched in a zigzag pattern between positions corresponding to both lateral ends of each sub belt layers 7a, 7b of a product tire and wound in the circumferential direction several times, twice in the figure, so that the ribbon-like strip 13 is disposed with no gap; the crossing angle of the organic fiber cords 12 with respect to the circumferential line segment C in the center of the arranging area, which is to be positioned at the equatorial plan of the tire in a product tire, is within a range between 45 and 90 degrees, more preferable within a range between 80 and 90 degrees to form; and the thus-formed sub belt layer member 11 are vulcanized.

It has been discussed based on the assumption that the crossing angle of the organic fiber cords with respect to the circumferential line segment C in the center of the arranging area is generally equal to the crossing angle of the organic fiber cords 12 of the product tire with respect to the equatorial plan of the tire. However, if the crossing angle of the organic fiber cords 12 of the sub belt layers 7a, 7b with respect to the equatorial plane of the tire largely changes from the above-mentioned crossing angle of the organic fiber cords 12 of the sub belt layer member 14, the crossing angle of the organic fiber cords 12 with respect to the circumferential line segment C needs to be selected in prospect of such a change of the crossing angle.

By the way, as shown in FIG. 3, in the first winding of the ribbon-like strip 13, the strip 13 extends in a zigzag pattern with a gap having the same width as that of the strip between the adjacent sections of the strip and in the second winding, the strip extends in a zigzag pattern so as to fill the gap entirely. As a result, large bending stress or strain in the ribbon-like strip 13, and in turn, in the organic fiber cords 12 is not generated and unnecessary overlap of each organic fiber cord at each bent portion is effectively prevented so that the sub belt layer member 14 can be formed easily and rapidly.

Alternatively, in the first winding of the ribbon-like strip 13, if the strip 13 extends in a zigzag pattern with a gap having several times larger width than that of the strip, the number of windings required for forming one sub belt layer member 14 is increased but stress and strain generated in the organic fiber cords 12 due to forming of the sub belt layer member 14 can be reduced more effectively.

Consequently, as shown in the figure, when each sub belt layer member 14 is formed by extending the ribbon-like strip 14 twice in the circumferential direction of the tire with the crossing angle of each organic fiber cord 12 with respect to the circumferential line segment C of the tire being 90 degrees, the sub belt layer member 14 is vulcanized to form sub belt layer 7a, 7b, each of which is formed in such a manner that a plurality of organic fiber cords 12 arranged in parallel to each other are wound twice in the circumferential direction of the tire, and that the crossing angle of each organic fiber cord 12 with respect to the equatorial plane E of the tire is 90 degrees with the assumption that there is almost no change between the crossing angle and the crossing angle of the organic fiber cord 12 with respect to the above-mentioned circumferential line segment C.

It is preferable that a width $W_0$ of the main belt 6 consisting of one or more main belt layers is within a range between 100% and 110% of the tread contact width W, and a width $W_1$ of the sub belt 7 consisting of one or more sub belt layers 7a, 7b, two in the figure, is within a range between 80% and 100% of the tread contact width W and less than 90% of the width $W_0$ of the main belt 6.

The tire for an aircraft configured in the above manner enables, especially under the function of the sub belt 7, to enhance abrasion resistance to the tread contact surface and effectively to improve running durability, as mentioned in the above, as well as to effectively prevent peeling of the non-extensible cords 9 of the main belt layers due to external injury from progressing in the circumferential direction.

EXAMPLES

Example 1

Tires of this example having the above-mentioned structure and a size of 50×20.0 R22 34PR are experimentally manufactured and each of them is mounted on a rim having a size of 50×20.0 R22 and filled with air at an air pressure of 1620 kPa. A generation rate of standing wave of each tire is measured to obtain the result shown in Table 1. In this test, the generation rate of standing wave is measured when the tire is accelerated at a constant acceleration from a stopping state to a regulated velocity (378.2 km/h (235 mile/h)) for the tire size until a running distance reaches 3505.2 m (11500 ft) under a load corresponding to 187% of the maximum load capacity (27910 kg).

In Table 1, there is also shown the measurement result of a tire of Comparative Example by an index value, in which the width of the main belt is 100% of the tread contact width, the width of the sub belt is 90% of the tread contact width and the crossing angle of the organic fiber cords of the sub belt layer with respect to the equatorial plane of the tire is 10 degrees.

TABLE 1

|  | Width of Main Belt (vs. Contact Width) | Width of Sub Belt (vs. Contact Width) | Crossing Angle of Cord of Sub Belt Layer | Generation Rate of Standing Wave (index value) |
| --- | --- | --- | --- | --- |
| Tire of Example | 95% | 90% | 90 degrees | 97 |
|  | 100% | 90% | 90 degrees | 100 |
|  | 110% | 90% | 90 degrees | 105 |
|  | 115% | 90% | 90 degrees | 108 |
| Tire of Comparative Example | 100% | 90% | 90 degrees | 100 |

In Table 1, the larger index value means the better result with using the value of the tire of Comparative Example as control.

Since the generation rate of standing wave is not affected by the width of the sub belt layer, the width of the sub belt layer is fixed to 90% of the contact width while only the width of the main belt layer is varied in Table 1. It turns out according to the result of Table 1 that the increase of the width of the main belt involves the increase of the generation rate of the standing wave.

Example 2

Tires of this example having the same size as that mentioned above are experimentally manufactured and each of them is mounted on a rim and filled with air in the similar way to the above. A constant load corresponding to 80% of the maximum load capacity is applied to the tire and under the circumstances, the tire is rotated at constant velocity of 64.37 Km/h (40 mile/h) for 4 minutes, which is defined as one cycle. A running durability test is performed by repeating the cycles with an interval of 120 minutes between each cycle, and the running distance until failure due to separation between layers of the main belt and sub belt is generated is measured. The results are shown in Table 2 in index values. Other parameters of the tires of Examples and Comparative Example are also shown in Table 2.

TABLE 2

|  | Width of Main Belt (%) (vs. Contact Width) | Width of Sub Belt (%) (vs. Contact Width) | Crossing Angle of Cord of Sub Belt Layer (degree) | Running Durability (index value) |
| --- | --- | --- | --- | --- |
| Tire of Example | 100 | 90 | 40 | 105 |
|  |  | 100 |  | 80 |
|  | 110 | 90 |  | 100 |
|  |  | 100 |  | 100 |
|  | 100 | 90 | 60 | 100 |
|  |  | 100 |  | 80 |
|  | 110 | 90 |  | 105 |
|  |  | 100 |  | 100 |
|  | 100 | 90 | 90 | 115 |
|  |  | 100 |  | 80 |
|  | 110 | 90 |  | 110 |
|  |  | 100 |  | 105 |
| Tire of Comparative Example | 100 | 90 | 10 | 100 |

In Table 2, the larger index value means the better result with using the value of the tire of Comparative Example as control.

From Table 2 in which the crossing angle of the cords of the sub belt layer and each width of the main and sub belts are shown as parameters, it turns out that the larger crossing angle of the cords of the sub belt layer gives better durability, and as of the correlation between the widths of the main and sub belts, the smaller width of the sub belt layer yields the better running durability, and the excessive width of the main belt versus the contact reduces the effect of optimizing the width of the sub belt and the crossing angle of the cords of the sub belt layer.

Example 3

Tires of this example are mounted on a rim and filled with air in a similar way to tires described in Example 1. A load corresponding to the maximum load capacity is applied to each tire, and an abrasion resistance test is performed in which the tire is rotated at very low velocity (less than 25 mm/s) to measure abrasion workload (amount of slipping of the tread). The results are shown in Table 3 in index values.

TABLE 3

|  | Width of Main Belt (%) (vs. Contact Width) | Width of Sub Belt (%) (vs. Contact Width) | Crossing Angle of Cord of Sub Belt Layer (degree) | Abrasion Resistance (index value) |
| --- | --- | --- | --- | --- |
| Tire of Example | 100 | 90 | 40 | 103 |
|  |  | 100 |  | 105 |
|  | 110 | 90 |  | 103 |
|  |  | 100 |  | 105 |
|  | 100 | 90 | 60 | 107 |
|  |  | 100 |  | 110 |
|  | 110 | 90 |  | 107 |
|  |  | 100 |  | 110 |
|  | 100 | 90 | 90 | 110 |
|  |  | 100 |  | 115 |
|  | 110 | 90 |  | 110 |
|  |  | 100 |  | 115 |
| Tire of Comparative Example | 100 | 90 | 10 | 100 |

The Table 3, the larger index value means the better result with using the value of the tire of Comparative Example as control.

It is clear from the results of Table 3 the larger width of the main belt and the larger crossing angle of the cords of the sub belt layer give a larger abrasion resistance.

Example 4

Figure 4:
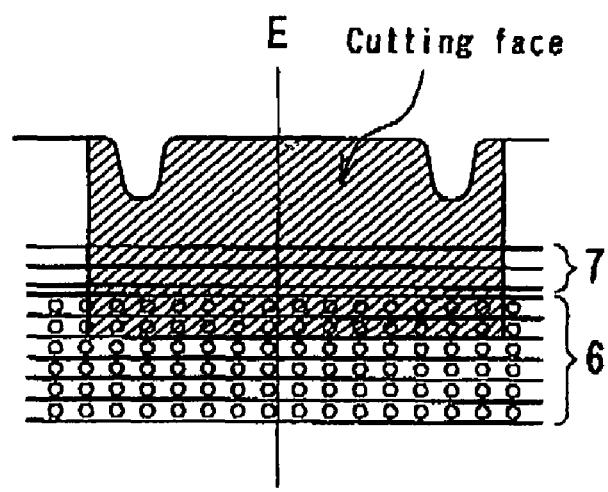
FIGS. 4a and 4b are sectional and plan views, respectively, showing a state of formed external injury for a durability test after a tire suffers external injury.
Figure 4:
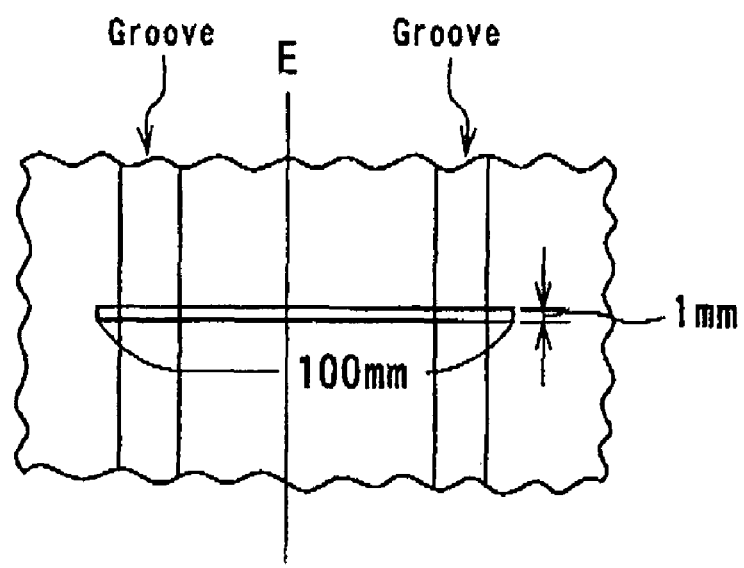

Tires of this example having a size of 50×20.0 R22 34PR are experimentally manufactured. In each of the tires, there is preliminarily made in the widthwise central area of the tread surface, as shown in FIG. 4, injury having a length of 100 mm and a width of 1 mm in the width direction of the tread and reaching the two outer main belt layers of the six main belt layers. Thus-injured tire is mounted on an applicable rim (50×20.0 R22) and filled with air at a given air pressure (1620 kPa), and then a load corresponding to the maximum load capacity (27910 kg) is applied to the tire. In this state, a durability test after the tire suffers external injury is performed in which accelerating up to 378.2 km/h (235 mile/h) within the distance of 3505.2 m (11500 ft) is repeated until failure of peeling is generated in the tread and the number of the test conducted until a failure is generated is. The results are shown in Table 4.

It is noted that in this example, "injury" is provided in the central area of the tread, and since both of the main and sub belts by themselves don't affect the durability, the width of the main belt is set to 100% of the tread contact width and the width of the sub belt is set to 90% of the tread contact width.

TABLE 4

|  | Width of Main Belt (%) (vs. Contact Width) | Width of Sub Belt (%) (vs. Contact Width) | Crossing Angle of Cord of Sub Belt Layer (degree) | Durability after Suffering External Injury (index value) |
| --- | --- | --- | --- | --- |
| Tire of Example | 100 | 90 | 40 | 115 |
|  | 100 | 90 | 60 | 130 |
|  | 100 | 90 | 90 | 150 |
| Tire of Comparative Example | 100 | 100 | 10 | 100 |

In Table 4, the larger index value means the better result with using the value of the tire of Comparative Example as control.

It turns out from the results of Table 4 that the durability is improved by increasing the crossing angle of the cords of the sub belt layer.

What is claimed is:

1. A tire for an aircraft comprising
   a pair of bead cores,
   a carcass consisting of one or more carcass plies toroidally extending between the bead cores,
   a main belt disposed on an outer peripheral side of a crown area of the carcass and consisting of one or more main belt layers having a spirally-wound structure of a non-extensible cord, and
   a sub belt disposed on the outer peripheral side of the main belt and consisting of one or more sub belt layers having an organic fiber cord extending in a circumferential direction of the tire in a zigzag pattern,
   wherein the sub belt layer is formed in such a manner that the organic fiber cord is bent in a zigzag pattern with no overlap of each organic fiber cord with itself at each bent portion and is wound several times in the circumferential direction of the tire, and that a crossing angle of the organic fiber cord with respect to an equatorial plane of the tire is within a range between 45 degrees and 90 degrees, and
   a width of the main belt is within a range between 100% and 110% of a tread contact width,
   a width of the sub belt is within a range between 80 and 100% of the tread contact width and less than 90% of the width of the main belt, and
   wherein each sub belt layer is formed by a strip having the organic fiber cord extending in the circumferential direction of the tire in the zigzag pattern, and
   the strip is formed to extend in the zigzag pattern with a gap having at least the same width as that of the strip between adjacent sections of the strip, and
   wherein the strip is wound several times in the circumferential direction of the tire so as to fill entirely the gap formed by the zigzag pattern of the strip with a successive winding.

2. The tire for an aircraft according to claim 1, wherein the sub belt layer is formed in such a manner that a plurality of organic fiber cords arranged in parallel to each other are wound twice in the circumferential direction of the tire, and that the crossing angle of the organic fiber cord with respect to the equatorial plane of the tire is 90 degrees.

3. A method for producing a tire for an aircraft comprising
a pair of bead cores,
a carcass consisting of one or more carcass plies toroidally extending between the bead cores,
a main belt disposed on an outer peripheral side of a crown area of the carcass and consisting of one or more main belt layers having a spirally-wound structure of a non-extensible cord, and
a sub belt disposed on the outer peripheral side of the main belt and consisting of one or more sub belt layers having an organic fiber cord extending in a circumferential direction of the tire in a zigzag pattern, the method comprising the steps of:
forming a main belt layer member having a width within a range between 100% and 110% of a tread contact width by spirally winding, around a line corresponding to a central axis of a product tire, a strip in which one non-extensible cord or plural non-extensible paralleled cords are rubber-coated,
forming a sub belt layer member, having a width within a range between 80 and 100% of the tread contact width and less than 90% of the width of the main belt layer, by bending in a zigzag pattern between positions corresponding to both lateral ends of the sub belt layer of a product tire with no overlap of each organic fiber cord with itself at each bent portion, a ribbon-like strip in which one non-extensible organic fiber cord or plural non-extensible paralleled organic cords are rubber-coated with a crossing angle of the organic fiber cord with respect to a circumferential line segment of the tire being within a range between 45 degrees and 90 degrees, and winding the zigzag shaped strip in the circumferential direction several times, and
wherein each sub belt layer is formed by a strip having the organic fiber cord extending in the circumferential direction of the tire in the zigzag pattern, and
the strip is formed to extend in the zigzag pattern with a gap having at least the same width as that of the strip between adjacent sections of the strip, and
wherein the strip is wound several times in the circumferential direction of the tire so as to fill entirely the gap formed by the zigzag pattern of the strip with a successive winding.

4. The method for producing a tire for an aircraft according to claim 3, wherein the sub belt layer member is formed by extending the ribbon-like strip twice in the circumferential direction of the tire with the crossing angle of the organic fiber cord with respect to the circumferential line segment of the tire being 90 degrees.

5. A tire for an aircraft comprising:
a pair of bead cores;
a carcass consisting of one or more carcass plies toroidally extending between the bead cores;
a main belt disposed on an outer peripheral side of a crown area of the carcass and consisting of one or more main belt layers having a spirally-wound structure of a non-extensible cord; and
a sub belt disposed on the outer peripheral side of the main belt and consisting of one or more sub belt layers each formed by a strip having an organic fiber cord extending in a circumferential direction of the tire in a zigzag pattern,
wherein the strip is formed to extend in the zigzag pattern with a gap having at least the same width as that of the strip between adjacent sections of the strip in such a manner that the organic fiber cord bent in the zigzag pattern with no overlap of each organic fiber cord with itself at each bent portion is wound several times in the circumferential direction of the tire so as to fill the gap entirely with a successive winding, and that a crossing angle of the organic fiber cord with respect to an equatorial plane of the tire is within a range between 45 degrees and 90 degrees.

* * * * *